United States Patent
Burns et al.

(10) Patent No.: US 9,655,373 B2
(45) Date of Patent: May 23, 2017

(54) METHOD AND APPARATUS FOR THE STERILIZATION OF GROUND MEAT USING SUPERCRITICAL $CO_2$

(71) Applicant: NOVASTERILIS, INC., Ithaca, NY (US)

(72) Inventors: David Burns, Ithaca, NY (US);
Thomas Steffie, Ithaca, NY (US);
Alecia Eppelsheimer, Auburn, NY (US)

(*) Notice: Subject to any disclaimer, the term of this patent is extended or adjusted under 35 U.S.C. 154(b) by 629 days.

(21) Appl. No.: 13/738,517

(22) Filed: Jan. 10, 2013

(65) Prior Publication Data
US 2014/0193552 A1    Jul. 10, 2014

Related U.S. Application Data

(60) Provisional application No. 61/585,062, filed on Jan. 10, 2012.

(51) Int. Cl.
| | |
|---|---|
| A23B 4/033 | (2006.01) |
| A23B 4/16  | (2006.01) |
| A23B 4/005 | (2006.01) |
| A23L 3/3508 | (2006.01) |
| A23B 4/24  | (2006.01) |

(52) U.S. Cl.
CPC .......... *A23B 4/0053* (2013.01); *A23B 4/24* (2013.01); *A23L 3/3508* (2013.01)

(58) Field of Classification Search
CPC .... A23B 4/08; A23B 4/24; A23B 4/12; A23B 4/027; A23B 4/20; A23B 4/00; A23B 4/06; A01N 59/04; A61L 2/0082
USPC ........................................... 426/332
See application file for complete search history.

(56) References Cited

U.S. PATENT DOCUMENTS

| | | | |
|---|---|---|---|
| 2006/0292274 A1* | 12/2006 | Garwood | 426/335 |
| 2007/0224206 A1* | 9/2007  | Christensen | 424/184.1 |

* cited by examiner

*Primary Examiner* — Michele L Jacobson
(74) *Attorney, Agent, or Firm* — Welsh Flaxman & Gitler LLC

(57) ABSTRACT

A method for sterilizing a ground meat product through the application supercritical $CO_2$ during the processing of the meat by introducing supercritical $CO_2$ into an extruder as the meat passes through the extruder while controlling the pressure and speed at which the meat passes through the extruder to maintain the meat in contact with the supercritical $CO_2$ for a time sufficient to achieve a log reduction in colony forming units of microbial contaminants.

4 Claims, 1 Drawing Sheet

Figure 1:
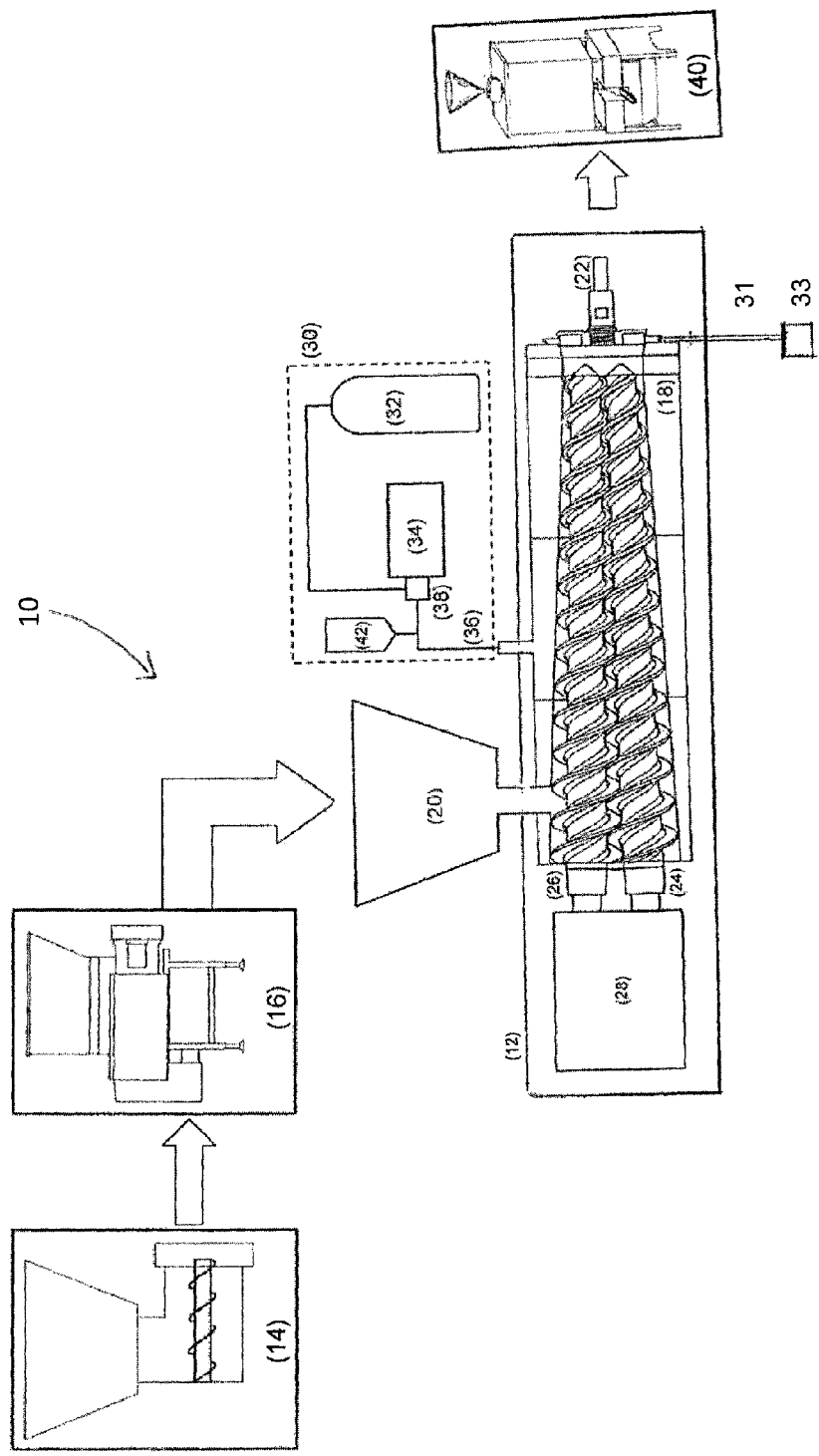

METHOD AND APPARATUS FOR THE STERILIZATION OF GROUND MEAT USING SUPERCRITICAL $CO_2$

BACKGROUND OF THE INVENTION

1. Field of the Invention

The present invention relates to the sterilization of ground meat. In particular, the present invention relates to the sterilization of ground meat using supercritical $CO_2$.

2. Description of the Related Art

The meat manufacturing industry processes ground meat in a manner that is intended to reduce and eliminate the exposure of the food product to microbes so as to prevent contamination. However, current methods of sterilizing ground meat produces a product that is either too expensive, loses vital taste and texture characteristics, becomes unsightly or exposes the product to unwanted irradiation. While the federal government is of the opinion that exposing meat to radiation is a safe and effective way to kill *E. coli* and other pathogens, meat companies have been hesitant to use irradiation because of fears that it would make meat more expensive, change the taste and color, and provoke consumer opposition.

Recent outbreaks of *E coli*, *Listeria* and *Salmonella* serve as evidence of the dangerous health issues facing consumers as well as the high costs associated of recalls and lost product. *Escherichia coli* bacteria are commonly found in the lower digestive tract of humans and animals, and they are usually harmless. But one strain, *E. coli* 0157:H7, produces a toxin that can make people sick, typically after eating ground beef or produce that has been contaminated by cattle feces.

As part of its efforts to eradicate *E. coli*, the meat industry is experimenting with vaccines, antibiotics and feed additives that may reduce the level of *E. coli* 0157:H7 in cattle intestines. But so far, such vaccines, antibiotics and feed additives are not commercially available. To date, nearly all of the efforts to curb *E. coli* have focused on interventions at slaughterhouses and at grinding plants that produce a variety of meat products.

Hamburger meat, or ground beef, poses an elevated risk of illness because grinding can mix live *E. coli* bacteria throughout the meat, and consumers often undercook their hamburgers. Steaks pose less of a risk because any *E. coli* on the surface are likely to be killed during cooking.

In all, the beef industry says it spends upward of $350 million a year to keep harmful pathogens out of the meat it sells to the public. But even as expenditures keep rising, the industry appears to be losing ground.

The U.S. Department of Agriculture issued new guidelines in October 2007 urging the meat industry to adopt the latest technology to combat harmful forms of *E. coli*. But department officials acknowledge that short of irradiating the meat, there is no magic bullet to prevent *E. coli* contamination.

Thus, there is a need for economical, efficient and reliable methods for sterilizing ground meat as it is being processed without affecting the quality of the meat. The present invention achieves this goal by using supercritical $CO_2$ during the processing of the meat.

BRIEF DESCRIPTION OF THE DRAWINGS the FIGURE is a schematic of the system of the present invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

During the commercial processing of ground meat, the meat, after grinding, is commonly moved to packaging machinery under the control of an extrusion conveyance tube, referred to below as an extruder. While the meat is moving through the extruder at a controlled rate, the temperature and pressure within the extruder can be controlled. In accordance with the present invention, the ground meat is treated with supercritical $CO_2$ as it passes through the extruder. The treatment of the ground meat with supercritical $CO_2$ results in complete sterilization of the ground meat before it is packaged.

With reference to FIG. 1, the present invention provides a system 10 and method for sterilizing a ground meat product through the application supercritical $CO_2$ during the processing of the meat. As will be explained below in greater detail, the system 10 and method rely upon a pressure vessel in the form of an extruder 12, which functions to contain the meat in need of sterilization and provide an ideal environment for the application of supercritical $CO_2$. The apparatus and method also employ a source of supercritical $CO_2$ 30 connected to the extruder 12 and an optional source of water and a liquid chemical sterilization additive 42. The liquid chemical sterilization additive is selected from the group consisting of acetic acid, peracetic acid, trifluoroacetic acid, acetic acid derivatives or mixtures thereof connected operatively to the pressure vessel. The method involves introducing the supercritical $CO_2$, and optionally the sterilization additive 42, to the extruder 12 and a mechanism for controlling the pressure within the extruder 12 and the speed at which the meat passes through the extruder 12 in contact with the supercritical $CO_2$ thereby controlling and maintaining the meat in contact with the supercritical $CO_2$ for a time sufficient to achieve a log reduction preferably a 5-log or greater in colony forming units (CFUs) of microbial contaminants.

In particular, and with reference to FIG. 1, the system 10 and methodology of the present invention are implemented using conventional meat processing equipment. That is, after initial processing the meat is fed into a grinder 14 where it is ground to a desired consistency. After exiting the grinder 14, the ground meat enters a meat pump 16 and is transmitted to the extruder 12. The extruder 12 functions to convey the ground meat from the grinding stations and/or meat pump to packaging machinery 40.

In accordance with a preferred embodiment, the extruder 12 is a twin screw extruder. As is appreciated, a twin screw extruder 12 includes a substantially cylindrical housing member 18 having an input 20 at a first end and output end 22. First and second extrusion screws 24, 26 are mounted within the housing member 18 for rotation therein under the control of a drive motor 28. The extrusion screws 24, 26 are shaped and dimensioned to cause movement of ground meat entering the input end 20 of the extruder 12 toward the output end 22 of the extruder 12. The interaction of the first and second extrusion screws 24, 26 further causes mixing of the ground meat as it is moved from the input end 20 thereof to the output end 22 thereof. As is appreciated, extruder 12 may be modified to achieve the desire goals of the resulting meat product being processed. For example, the two extrusion screws may be co-rotating or counter-rotating, intermeshing or non-intermeshing.

Because of the closed nature of the extruder 12 resulting from the fact that the input 20 and output 22 are filled with ground meat during operation, the extruder 12, in particular, the extruder housing member 18, provides an ideal environment for the treatment of the ground meat with supercritical $CO_2$. In particular, the supercritical $CO_2$ assembly 30 includes a $CO_2$ supply 32 in fluid communication with a $CO_2$ pump 34. In accordance with a preferred embodiment, the $CO_2$ pump 34 is a Haskel liquid $CO_2$ pump. A fluid communication tube 36 couples the output 38 of the $CO_2$ pump 34 to the extruder housing member 18. As shown, the fluid communication tube 36 is coupled to the housing member 18 at a central position along the length of the housing member 18. However, the position is not important as the meat will be in contact with the supercritical $CO_2$ along the length of the extruder, as the supercritical $CO_2$ will envelope and mix with the meat within the extruder housing 18. In accordance with a preferred embodiment, the $CO_2$ coming from the $CO_2$ pump 34 enters the housing member 18 and is maintained at 1099 psi and 31.1 C or greater such that the $CO_2$ in the housing member 18 is in a supercritical state. The housing 18 further includes an exhaust line 31 which leads to a valve 33 to allow the $CO_2$ to be exhausted or recaptured.

The supercritical $CO_2$ being pumped from the $CO_2$ pump 34 to the housing member 18 can be enhanced by inputting chemical sterilization additive 42 to the $CO_2$ stream flowing within the fluid communication tube 36. Once the supercritical $CO_2$ enters the housing member 18, the ground meat is exposed to the supercritical $CO_2$ for a period of time sufficient to achieve the required log reduction in microbes. The exact amount of exposure time required by the desired reduction in microbes is adjusted by altering the turn rate of the extrusion screws 24, 26, that is, the rate at which the extrusions screws move to convey the ground meat through the extruder 12 at a desired speed. It is appreciated the exposure time may vary from 1 second to 1 hour depending on the infectious agents being targeted.

It is also appreciated that people working in the field of supercritical $CO_2$ processing, demonstrated that more resistant spore forming bacteria, for example *Bacillus licheniformis*, which are common in farm and agriculture environments, are more difficult to inactivate. To inactivate spore forming bacteria, the supercritical $CO_2$ process requires the addition of the optional small amount of the chemical sterilization additive preferably consisting of acetic acid, peracetic acid, trifluoroacetic acid, acetic acid derivatives or mixtures thereof to achieve significant log reductions.

While the preferred embodiments have been shown and described, it will be understood that there is no intent to limit the invention by such disclosure, but rather, is intended to cover all modifications and alternate constructions falling within the spirit and scope of the invention.

We claim:

1. A method for sterilizing a ground meat product through the application of supercritical $CO_2$ during the processing of the ground meat comprising:
   feeding meat into a grinder where it is ground into ground meat;
   transmitting the ground meat to an extruder;
   introducing supercritical $CO_2$ into the extruder as the ground meat passes through the extruder; and
   controlling the pressure and speed at which the ground meat passes through the extruder to maintain the ground meat in contact with the supercritical $CO_2$ while in the extruder to achieve a log reduction in colony forming units of microbial contaminants so as to sterilize the ground meat.

2. The method of claim 1, further including adding a liquid sterilization additive to the extruder as the meat passes through the extruder.

3. The method of claim 2, wherein the liquid sterilization additive is selected from the group consisting of acetic acid, peracetic acid, trifluoroacetic acid, acetic acid derivatives or mixtures thereof.

4. The method of claim 1, wherein the extruder has twin screws.

* * * * *